Patented May 2, 1939

2,156,828

UNITED STATES PATENT OFFICE 2,156,828

FRICTION BODIES

Karl Wolf, Ludwigshafen-on-the-Rhine, and Hans Scheuermann, Oggersheim, Germany, assignors to I. G. Farbenindustrie Aktiengesellschaft, Frankfort-on-the-Main, Germany, No Drawing. Application January 25, 1938, Serial No. 186,812. In Germany February 3, 1937

7 Claims. (Cl. 106—7.5)

The present invention relates to friction bodies.

In the preparation of friction bodies, as for example brake linings and clutch bodies, it is known to use as binding agents condensation products of polyhydric alcohols and polybasic acids, if desired with the addition of monobasic acids, monohydric alcohols and/or drying oils. Such friction bodies have a number of drawbacks, however. For example brake linings prepared from asbestos and a condensation product of polybasic aliphatic or aromatic saturated or unsaturated acids, such as adipic acid, maleic acid or phthalic acid, and polyhydric alcohols, such as glycerine, with or without the addition of drying oils, have friction values which are very greatly dependent on temperature and in some cases, even when the initial value is high, fall after long use to values at which no sufficient braking action is obtained.

A further drawback in some cases lies in the very long hardening periods, i. e. the time necessary to convert the still soluble condensation products which fuse at elevated temperature into the insoluble and infusible state. These hardening periods are especially long when the condensation products contain drying oils and require a certain amount of oxygen for thorough hardening.

We have now found that friction bodies, i. e. brake and clutch bodies, which are free from the said drawbacks and have especially good properties are obtained by using as the binding agent condensation products capable of being hardened which have been derived from polyhydric alcohols, such as glycols, glycerine, trimethylol propane, pentaerythritol, polyglycols, polyglycerine or other polymerized alcohols and polybasic acids, such as phthalic acid, succinic acid, adipic acid, maleic acid and the like, as well as natural resin acids, in particular colophony or the abietic acids contained therein, or their derivatives, as for example esters.

When alpha-beta-unsaturated acids, such as maleic acid, are used as polybasic acids, these may also be caused to react with the natural resin acids or their esters before the condensation with the polyhydric alcohols.

As polyhydric alcohols, the condensation products may also contain highly polymerized alcohols, such as polyvinyl alcohol. Products of this kind may be obtained for example by heating the said acids with polymerized vinyl esters, the acid contained in the latter being thereby wholly or partly split off.

Brake linings prepared from the said condensation products and asbestos have good mechanical strength, specially uniform and high braking values and at the same time less wear than brake linings of phenol resins. Their braking action is, in particular, practically independent of temperature so that even when used for long periods a uniform braking is always ensured. The surfaces of the brake linings polish clean and, contrasted with other linings prepared from condensation products free from resin acids, are free from decomposition products.

In the preparation of friction or clutch bodies from short-fibred asbestos, the raw materials may be ground with each other and pressed while hot when the condensation products are available in a solid form capable of being ground. It is more advantageous, however, to impregnate the asbestos with a solution of the condensation product and then to dry preliminarily at from 140° to 150° C. for some hours. The dried material, which is usually somewhat agglomerated, is then ragged out again in the cold in a tearing or crushing apparatus, whereby in the following pressing process a good felting of the fibres is obtained and weak places in the pressed article are avoided. The loose fibres are preferably pressed by first laying a thin strip of paper or metal in the mould which is at a temperature of from 120° to 175° C., then laying the fibres in in a uniform layer and covering them with a similar strip. The pressing is then effected advantageously at pressures of from 50 to 250 kilograms per square centimeter. After opening the mould, the pressed article may readily be removed from the mould because the strips prevent sticking. The hardening is effected in a chamber at from 150° to 250° C.

When preparing brake or clutch bodies from plaited or woven material, as for example woven asbestos, with or without wire insertions, the woven material is preferably impregnated with a solution of the condensation product, dried while heating and pressed.

The following examples will further illustrate how this invention may be carried out in practice, but the invention is not restricted to these examples. The parts are by weight.

Example 1

A mixture of 296 parts of a condensation product (acid value from 15 to 20) obtained by heating 1 molecular proportion of phthalic anhydride with 2 molecular proportions of glycerine at from 200° to 250° C., 100 parts of colophony and 97.3 parts of adipic acid is heated at from 180° to 220°

C. for 2 hours. After cooling to 100° C., sufficient ethyl alcohol is added to form an about 60 per cent solution.

189 parts of this solution are mixed with 200 parts of short-fibred asbestos in a kneading machine. The whole is then dried for about 5 hours at from 140° to 150° C. The dried, somewhat agglomerated material is loosened again between crushing and tearing rollers.

A thin strip of paper, of a thickness depending on the finished lining, is laid in a brake lining mould which is at a temperature of from 165° to 170° C. The loose, impregnated asbestos is then laid uniformly in the mould, a second strip of paper laid on and the mould closed. After pressing for 5 minutes at a pressure of 150 kilograms per square centimeter, a pressed article is obtained which may be removed from the mould readily. After hardening for 12 hours at from 150° to 200° C., it yields a brake lining having excellent properties. The wear during braking is only about half of that of a brake lining prepared with a phenol resin.

Example 2

296 parts of a condensation product prepared from glycerine and phthalic anhydride according to Example 1 and 286 parts of a condensation product of 1 molecular proportion of maleic acid and 1 molecular proportion of abietic acid are heated for 2½ hours at from 200° to 230° C. The product is poured into dishes while still hot and ground after solidification. 67 parts of the product are ground for half an hour in a ball mill with 200 parts of short-fibred asbestos and the ground material is pressed and hardened in the manner described in Example 1.

Example 3

A solution of 128 parts of polymerized vinyl acetate in 200 parts of alcohol is allowed to flow at 140° C. while stirring well and continuously distilling off the alcohol into a condensation product obtained by condensing 116 parts of maleic acid and 330 parts of abietic acid with 69 parts of glycerine in the presence of 200 parts of xylene while continuously distilling off xylene and water formed until the temperature in the reaction vessel has risen to about 200° C., which is the case after about ½ hour. While further removing the solvent, the temperature is raised during the course of 2½ hours to 220° C. After cooling to about 100° C., the resin is taken up in a mixture of alcohol and toluene.

Bands of woven asbestos material are laid in a 40 per cent solution of the said condensation product for 24 hours, then dried for 4 hours at 140° C., brought while still hot into a mould which is either cold or at a temperature of from about 40° to 50° C. and pressed for one minute at a pressure of 200 kilograms per square centimeter. After cooling, the pressed article may be removed from the mould and is entirely stable as regards shape.

By hardening for 12 hours at from 125° to 200° C., brake linings of excellent braking action are obtained.

What we claim is:

1. Friction bodies, the binding agent of which comprises hardened resinous condensation products of polyhydric alcohols, polybasic acids and natural resin acids.

2. Friction bodies, the binding agent of which comprises hardened resinous condensation products of polyhydric alcohols, polybasic acids and a member of the group consisting of colophony and the resin acids contained therein.

3. Friction bodies, the binding agent of which comprises hardened resinous condensation products of alpha-beta-unsaturated dicarboxylic acids, polyhydric alcohols and natural resin acids.

4. Friction bodies, the binding agent of which comprises hardened resinous condensation products of polybasic acids, natural resin acids and polyvinyl alcohol.

5. Friction bodies, the binding agent of which comprises hardened resinous condensation products of phthalic acid, glycerine and colophony.

6. Friction bodies, the binding agent of which comprises hardened resinous condensation products of phthalic acid, maleic acid, colophony and glycerine.

7. Friction bodies, the binding agent of which comprises hardened resinous condensation products of polyvinyl alcohol, maleic acid and abietic acid.

KARL WOLF.
HANS SCHEUERMANN.